United States Patent
Schleiden et al.

(10) Patent No.: US 8,495,994 B2
(45) Date of Patent: Jul. 30, 2013

(54) SEPARATOR FOR CRANK HOUSING VENTILATION OF AN INTERNAL COMBUSTION ENGINE

(75) Inventors: Thomas Schleiden, Oberstenfeld (DE); Andreas Weber, Freiberg (DE)

(73) Assignee: Mann + Hummel GmbH, Ludwigsburg (DE)

(*) Notice: Subject to any disclaimer, the term of this patent is extended or adjusted under 35 U.S.C. 154(b) by 286 days.

(21) Appl. No.: 12/992,607

(22) PCT Filed: May 12, 2009

(86) PCT No.: PCT/EP2009/055685
§ 371 (c)(1),
(2), (4) Date: Jan. 24, 2011

(87) PCT Pub. No.: WO2009/138384
PCT Pub. Date: Nov. 19, 2009

(65) Prior Publication Data
US 2011/0108014 A1    May 12, 2011

(30) Foreign Application Priority Data
May 16, 2008  (DE) ............ 20 2008 006 719 U

(51) Int. Cl.
*F01M 13/00* (2006.01)
*F02B 25/06* (2006.01)

(52) U.S. Cl.
USPC ......... 123/573; 123/572; 123/574; 123/41.86

(58) Field of Classification Search
USPC ..................... 123/572–574, 41.86
See application file for complete search history.

(56) References Cited

U.S. PATENT DOCUMENTS

| | | | | |
|---|---|---|---|---|
| 3,915,679 A * | 10/1975 | Roach et al. | ............ | 55/347 |
| 4,894,073 A | 1/1990 | Andreae | | |
| 5,507,268 A * | 4/1996 | Schlattl | ............ | 123/572 |
| 7,059,311 B2 * | 6/2006 | Prasad | ............ | 123/573 |

(Continued)

FOREIGN PATENT DOCUMENTS

| | | |
|---|---|---|
| DE | 102004037157 | 3/2006 |
| DE | 102006056789 | 8/2007 |
| DE | 102006024816 | 12/2007 |

(Continued)

OTHER PUBLICATIONS

DPMA search report of DE 20 2008 006 719.7.

*Primary Examiner* — Lindsay Low
*Assistant Examiner* — Tea Holbrook
(74) *Attorney, Agent, or Firm* — James Hasselbeck

(57) ABSTRACT

The invention relates to a separator for crank housing ventilation of an internal combustion engine. The separator comprises at least one vortex chamber (2) extending along a longitudinal axis (3), wherein the vortex chamber (2) comprises an inlet for a ventilation stream (6), in particular a tangential inlet, relative to the longitudinal axis (3) at an end (4) on the inlet side. The vortex chamber (2) further comprises a common outlet (8) for the ventilation stream (6) and for oil entrained along with the ventilation stream (6), said common outlet being located at the end on the outlet side of the vortex chamber opposite the end (4) on the inlet side, relative to the longitudinal axis (3). The vortex chamber (2) is enclosed in the outlet (8) area thereof by an impact absorber (9) comprising an impact base (10) and a peripheral wall (11), wherein the impact base (10) covers the outlet (8) at a distance therefrom.

15 Claims, 2 Drawing Sheets

U.S. PATENT DOCUMENTS

| | | | |
|---|---|---|---|
| 7,080,636 B2 * | 7/2006 | Knaus et al. | 123/572 |
| 7,604,676 B2 * | 10/2009 | Braziunas | 55/385.3 |
| 7,871,461 B2 * | 1/2011 | Saito | 96/174 |
| 8,267,071 B2 * | 9/2012 | Janssen et al. | 123/572 |
| 2006/0032486 A1 * | 2/2006 | Prasad | 123/572 |
| 2007/0175186 A1 | 8/2007 | Braziunas | |
| 2010/0294218 A1 * | 11/2010 | Ruppel et al. | 123/41.86 |
| 2011/0030629 A1 * | 2/2011 | Schleiden | 123/41.86 |

FOREIGN PATENT DOCUMENTS

| | | |
|---|---|---|
| DE | 102006038700 | 2/2008 |
| EP | 0337940 | 10/1989 |
| EP | 1500423 | 1/2005 |

* cited by examiner

SEPARATOR FOR CRANK HOUSING VENTILATION OF AN INTERNAL COMBUSTION ENGINE

CROSS REFERENCE TO RELATED APPLICATIONS

This application is US National Stage Entry of international patent application no. PCT/EP2009/055685, filed May 12, 2009 designating the United States of America, the entire disclosure of which is incorporated herein by reference. Priority is claimed based on Federal Republic of Germany patent application no. 20 2008 006719.7, filed May 16, 2008.

The invention concerns a separator for a crank housing ventilation of an internal combustion engine with the features according to the preamble of claim 1.

PRIOR ART

In regard to crank housing ventilation of internal combustion engines, swirl separators with a swirl chamber are used. The swirl chamber extends along a longitudinal axis and, relative to this longitudinal axis, has an inlet side end with a tangential inlet for the venting flow. In the swirl chamber the venting flow, as a result of the tangential introduction, is imparted with a swirling action that in connection with the centrifugal forces that are acting causes a separation of the oil that is entrained in the venting flow. The oil deposits on the walls of the swirl chamber and is discharged through a drain opening.

Typically, in this connection the configuration of a so-called counter-flow cyclone is used in which the drain opening for the oil and the outlet for the purified gas stream are positioned at opposite ends of the swirl chamber. The outlet is positioned at the same side as the inlet while the drain opening is positioned on the opposite side. In this connection, the flow experiences a deflection and is discharged through a so-called immersion tube at the top of the swirl chamber where the inlet side is. Alternatively, also so-called parallel flow cyclones may be used in which the drain opening for the oil and the separate outlet for the purified gas are on the same side and are thus positioned opposite the inlet. In a direct comparison, the counter flow cyclone has a better ratio between pressure loss and separating diameter or degree of separation wherein the separating diameter is used as a measure for the lower limit of the oil droplets to be separated.

Moreover, it is known that in swirl separators the separating diameter generally also depends, aside from pressure loss, on the size of the separator. For the same pressure loss, the separating diameter drops with decreasing size of the swirl separator. Accordingly, the degree of separation for smaller particles is also increased for decreasing apparatus size. For this reason, there is the desire to use, instead of one or a small number of swirl separators of larger size, a larger number of smaller parallel-connected swirl separators.

However, there are geometric limits for making the counter-flow cyclones smaller because of the existing immersion pipe, so that miniaturization cannot be advanced to an unlimited extent. The same holds true also for parallel flow cyclones in which the drain opening for the oil and the outlet for the purified gas stream require an appropriate size. Accordingly, there is still the need to improve the degree of separation while reducing the apparatus volume.

The invention has the object to further develop a separator of the aforementioned kind such that an improved efficiency is provided while the apparatus is small.

This object is solved for a separator with features of claim 1.

SUMMARY OF THE INVENTION

A separator for a crank housing ventilation of an internal combustion engine is proposed in which the swirl chamber, relative to the longitudinal axis, at the outlet side end that is opposite the inlet side end has a common outlet for the venting flow and the oil that is entrained in the venting flow. In this connection, the swirl chamber is enclosed in the area of its outlet by an impact cup with an impact base and with a circumferential wall wherein the impact base covers the outlet at a spacing.

The swirl chamber is not acting as a separator because the oil, in contrast to known configurations of the parallel flow cyclone, exits together with the venting flow, i.e., has not been separated from the venting flow. Instead, the swirl that is generated in the swirl chamber causes coagulation of oil mist and finest oil droplets to larger droplets or to an oil film. The venting flow that is processed in this way, after passing through the outlet, is deflected on the impact base and the circumferential walls of the impact cup relative to the longitudinal axis of the swirl chamber by 180 degrees. As a result of their high mass inertia, the coagulated oil drops can follow this deflection only to a limited extent. Instead, depending on their size, they impact either on the impact base or on the circumferential wall of the impact cup and form thereat an oil film that is separated.

Because of the inter-engagement of the swirl chamber and the impact cup a very compact configuration is provided that enables a miniaturization almost to any extent. In particular, a plurality of appropriately small-sized swirl chambers with impact cups can be connected fluidically in parallel so that as a result of the size effect a significantly increased separating action will result.

In a preferred embodiment the outlet is limited by a circumferential rim that extends in a single plane wherein the plane that is defined by the rim and the impact base are positioned parallel to one another. At the impact base a uniform flow deflection in all radial directions occurs with a collecting action for the oil droplets that is uniformly distributed about the circumference.

Expediently, between the rim of the outlet and the impact base a circumferentially extending gap is formed whose cross-sectional surface area is smaller than the cross-sectional surface area of the outlet. In this way, an acceleration of the venting flow in the gap is achieved that, in combination with the deflection of the venting flow, increases the centrifugal force action on the oil droplets and therefore improves the separation efficiency.

The impact cup is advantageously arranged axis-parallel and in particular coaxial to the longitudinal axis of the swirl chamber. Relative to the longitudinal axis of the impact chamber there is a 180 degree angle deflection of the venting flow that is distributed uniformly about the circumference of the swirl chamber. This enables optimization of the flow guiding action for all circumferential areas and this contributes to an increase of the efficiency.

In a preferred embodiment the swirl chamber has along its longitudinal axis beginning at the inlet side end up to the outlet side end, including the outlet, a constant or a widening cross-section. This enables the manufacture, for example, by injection molding technology without undercuts which makes it possible that the swirl chamber can be removed from the mold in the direction of its longitudinal axis. In this way, the geometric foundation for a manufacturing-technological realization of miniaturization of the swirl chamber is provided.

In a preferred development of the embodiment with several parallel-connected swirl chambers these several swirl chambers are arranged on a first baseplate and in particular configured monolithically therewith. In a single working step, for example, by injection molding, a monolithic component can be manufactured that forms the baseplate with integrally formed swirl chambers in the desired number and miniaturization. The same holds true also for the preferred embodiment in which an appropriate number of impact cups are arranged on a second baseplate and are particularly formed monolithically therewith. In deviation from the known configuration of cyclones, a seal-tight weld of housing parts is not required because between the swirl chamber and the correlated impact cup, respectively, no fluid-tight connection must be provided. The only required sealing functions are provided by the monolithically formed baseplates. Between the two baseplates a simple connecting technique is therefore sufficient which is provided in a cost-saving way preferably by a snap-on locking action.

An advantageous embodiment is the design of the swirl chamber inclusive of the inlet slot and of the section of the swirl chamber of the wall that is upstream of the first baseplate in axial direction as a monolithic injection-molded part without undercut so that removal from the mold in the main removal direction of the mold is possible without additional split. This embodiment is suitable in particular for the arrangement of several swirl chambers adjacent to one another in a very tight space.

Preferably, the second baseplate that supports the impact cups is provided with at least one outlet opening for the venting flow. The first baseplate forms in this connection the inlet openings and also a gas-tight separation of the raw side from the clean side. By means of the second baseplate the venting flow passes through at least one outlet opening to the clean side. Since the venting flow is initially deflected by the circumferential walls of the impact cups in opposite direction, for exiting from the at least one outlet opening a further flow deflection is required which causes an additional separating action on the first baseplate that supports the swirl chambers. The separating action is therefore further improved.

In an advantageous embodiment the first baseplate has means for oil collection. They can be formed in particular as ribs, grooves, knobs or other suitable surface structures formed monolithically on the first baseplate. They enhance the collection of oil that has been separated from the venting flow and facilitate drainage thereof.

In a further advantageous embodiment of the separator in addition to the means for oil collection, or in place thereof, a separating medium, in particular, a nonwoven or a fiber separator is inserted on the first baseplate. This separating medium ensures an additional oil separation in the area of the deflection of the venting flow in front of the first baseplate after leaving the impact cup of the blow-by gas. In this connection, the separating medium is preferably embodied as a mat and is arranged and secured before assembly of a first component, comprised of a first base baseplate and a swirl chamber, with a second component, comprised of a second baseplate and an impact cup, e.g. by a snap-on locking action of the components with one another, between these components in the area of the first baseplate. The separating medium in the area of the swirl chamber is cut out, for example, by stamping, and surrounds the swirl chamber in radial direction. This separating medium is advantageous in particular for a low volume flow as a result of a minimal pressure difference in the swirl separator because the separating efficiency of the swirl chamber is small for a minimal volume flow. In order for the separating medium to be configured as a life-time component, it is preferred to employ a coarse nonwoven. Otherwise, there is the risk of blockage of the nonwoven.

In addition, or as an alternative, it may be expedient that the at least one swirl chamber has arranged downstream thereof an after separator. Residual oil quantities that are exiting together with the venting flow after passing the swirl chambers and impact cups can thereby be separated with simple means. As after separators, separators known to a person skilled in the art, such as fiber separators, labyrinth separators or cyclones, can be used.

In an advantageous embodiment, a swirl chamber as a separating cell is arranged at the geodetic low point of the oil separator in the vicinity of the housing base. When the volume flow of the blow-by gas is very minimal or when the separator is in an operating state without volume flow, the oil drains from the area of the outlet as a result of gravity through the swirl chamber back to the raw side and then into the oil circuit. When the volume flow passing through this separating cell increases to a predetermined value, the separating cell works as an oil separator in analogy to further existing swirl chambers. As a result of this type of return flow, a non-return valve that is conventional in known oil separators and the thus needed hose connections are not required.

As a whole, in comparison to counter-flow cyclones or cyclones of other configurations, a significantly simplified manufacture results because no gas-tight welding of individual parts is required. In particular, the small size geometry can be produced easier. The obtainable miniaturization, hand in hand with the arrangement of several very small swirl chambers and impact cups enables high flexibility in regard to the integration into the available mounting space. In certain, for example, very flat mounting spaces, as they are found e.g. in the cylinder head covers, such an integration is now made possible for the first time with the inventive separator.

BRIEF DESCRIPTION OF THE DRAWINGS

Embodiments of the invention will be explained in the following with the aid of the drawing in more detail. It is shown in.

EMBODIMENT(S) OF THE INVENTION

Figure 1:
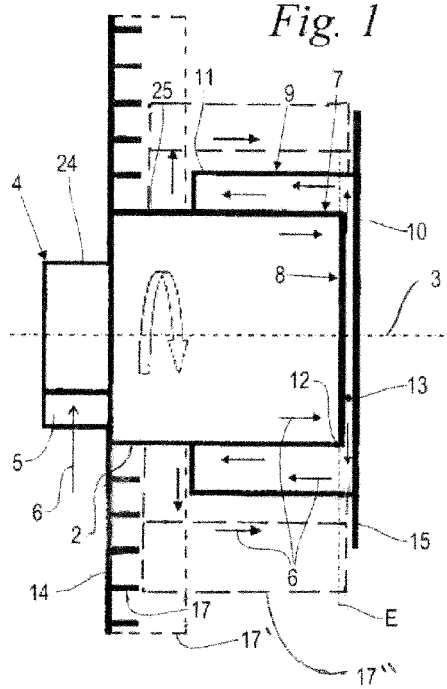
FIG. 1 in a schematic longitudinal section illustration a swirl chamber of the separator according to FIG. 3 with an impact cup enclosing the swirl chamber in the area of its outlet.
Figure 3:
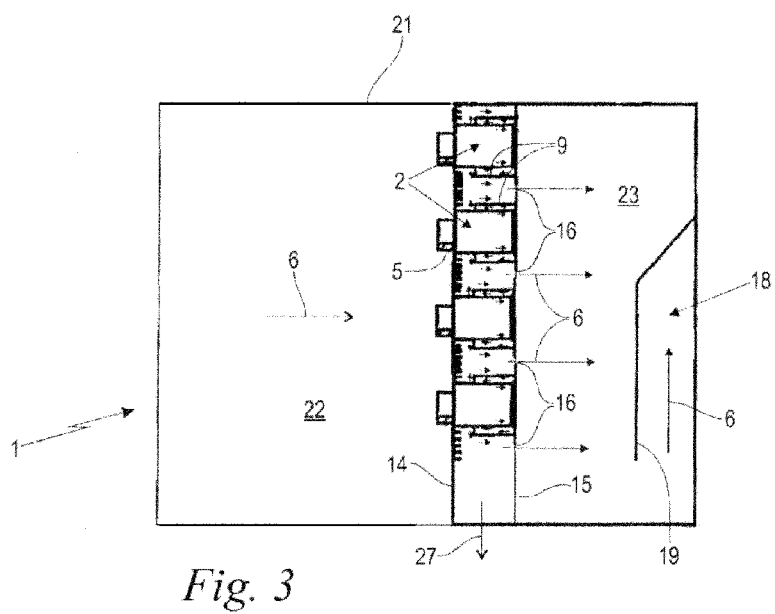
FIG. 3 in a schematic longitudinal section illustration an inventively embodied separator with swirl chambers and impact cups according to FIG. 1 and an after separator arranged downstream.

FIG. 1 shows in schematic longitudinal illustration an arrangement according to the invention of a swirl chamber 2 with an impact cup 9 as a part of a separator 1 disclosed in connection with FIG. 3 in more detail. The swirl chamber 2 is of rotational symmetry and extends along a longitudinal axis 3 from an inlet side end 4 to an outlet side end 7. In the area of the inlet side end 4 the swirl chamber 2 comprises a first cylindrical section 24 adjoined in the direction of the longitudinal axis 3 by a second cylindrical section 25. The second cylindrical section 25 extends from the first cylindrical section 24 up to the outlet side end 7. Here it ends with a circumferential rim 12 that surrounds an outlet 8. The circumferential rim 12 and the outlet 8 limited thereby have the same diameter as the second cylindrical section 25. At the inlet side end 4 a tangential inlet 5 opens into the first cylindrical section 24. This provides that the swirl chamber 2 along its longitudinal axis 3, beginning at the inlet 5 up to the outlet 8 has a cross-section that widens step-wise.

The swirl chamber 2 is attached to a baseplate 14 that is positioned perpendicularly to the longitudinal axis 3. For this purpose, in the illustrated embodiment, the swirl chamber is formed of plastic material by an injection-molding process as a monolithic part together with the first baseplate 14. The baseplate 14 has at its face that is facing the outlet 8 or the outlet side end 7 means 17 for collecting oil that, in the illustrated embodiment, are embodied as monolithically formed ribs. Knobs, recesses or the like may be expedient also. The ribs are projecting perpendicularly away from the face of the baseplate 14. In addition to or as alternative to the means 17, a separating medium 17' may be arranged in the area between the first baseplate 14 and the outlet side end 7. This separating medium 17' is flowed through by the venting flow 6 so that further oil particles are separated. The separating medium 17' is a nonwoven material or a fiber material. In connection with the widening cross-section of the swirl chamber 2, accordingly the aforementioned monolithic component can be produced in a simple injection mold without split or the like and can be removed from the mold without problems.

The swirl chamber 2 in the area of its outlet 8 is enclosed by the impact cup 9. The impact cup 9 comprises a plane impact base 10 as well as a cylindrical circumferential wall 11. The impact base 10 is positioned perpendicularly to the longitudinal axis 3 as well as parallel to the plane of the first baseplate 14 and covers in this connection the outlet 8 at a spacing thereto. The rim 12 of the outlet 8 is positioned in a plane E that is parallel to the impact base 10. In this way, between the rim 12 and the impact base 10 a circumferential gap 13 is formed that has in circumferential direction a constant gap width.

The cylindrical circumferential wall 11 of the impact cup 9 surrounds the second cylindrical section 25 of the swirl chamber 2 in the area of its outlet side end 7 at a radial spacing. In this connection, beginning at the impact base 10, it extends in the direction of the longitudinal axis 3 about a portion of the second cylindrical section 25 and ends with axial spacing relative to the first baseplate 14. The impact cup or its cylindrical circumferential wall 11 is positioned preferably axis-parallel to the longitudinal axis 3 of the swirl chamber 2 and in the illustrated embodiment is coaxial arranged thereto. Instead of the cylindrical configuration of the circumferential wall 11 also a conically widening embodiment can be expedient.

The impact cup 9 is attached to the second baseplate 15 that is arranged parallel to the first baseplate 14. In the illustrated embodiment, the impact cup 9 is formed as a monolithic part of plastic material by an injection molding process together with the second baseplate 15 wherein the impact base 10 is formed by the baseplate 15. The easy manufacture and removal from the mold in an injection molding process, even for very small configurations, are the result of the constant or continuously widening cross-section of the circumferential wall 11, in analogy to the above described swirl chamber 2.

Figure 2:
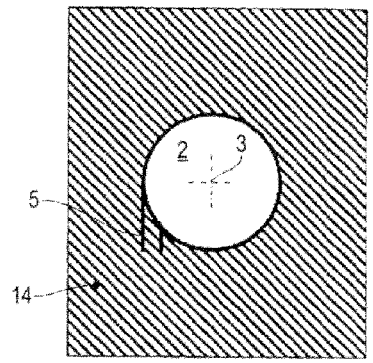
FIG. 2 in a schematic cross-sectional illustration the swirl chamber according to FIG. 1 in the area of its tangential inlet.

FIG. 2 shows in schematic cross-sectional illustration the swirl chamber 2 according to FIG. 1 in the area of its tangential inlet 5 that is arranged at the inlet side of the first baseplate 14. It can be seen that the inlet 5 opens with radial spacing to the longitudinal axis 3 tangentially in the area of the circumferential wall of the swirl chamber 2. However, an embodiment may be expedient also in which the inlet 5 is positioned at a slant radially inwardly. Moreover, an axial arrangement of the inlet 5 parallel to the longitudinal axis 3 is possible wherein appropriate guiding apparatus for generating a swirl in the swirl chamber 2 must be provided.

FIG. 3 shows in schematic longitudinal section illustration a separator 1 embodied according to the invention with a schematically indicated housing 21. The separator 1 is provided for the crank housing ventilation of an internal combustion engine, not illustrated, in particular of a motor vehicle. The two parallel arranged baseplates 14, 15 divide the interior of the housing 21 into a raw side 22 at the inlet side and a clean side 23 at the outlet side. In operation the venting flow 6 that is taken in from the crank housing is introduced into the raw side 22. The venting flow 6 carries with it an undesirable quantity of oil and other foreign matter.

The separator 1 has at least one swirl chamber 2 with a correlated impact cup 9. Preferably, several swirl chambers 2 on the first baseplate 14 and a corresponding number of impact cups 9 on the second baseplate 15 are provided wherein the plurality of swirl chambers 2 and correlated impact cups 9 can be connected fluidically in parallel. From the raw side 22 the oil-containing venting flow 9 passes through the swirl chambers 2 and impact cups 9 wherein the entrained oil is separated from the venting flow 6 in a way to be described in detail in the following.

The second baseplate 15 is provided with at least one outlet opening 16 for the venting flow 6. In the illustrated embodiment several outlet openings 16 are provided from which the purified venting flow 6 exits and reaches the clean side 23. Optionally, the arrangement of swirl chambers 2 and impact cups 9 has arranged downstream thereof an after separator 18 that in the illustrated embodiment is arranged within the housing 21 at the clean side 23. The after separator 18 can be designed as a cyclone or the like. Because of the high separating efficiency of the swirl chambers 2 together with the impact cups 9, however, the simple embodiment as illustrated here in the form of a labyrinth-like deflection with impact walls 19 can be satisfactory for the residually entrained oil droplets.

With reference simultaneously to FIGS. 1 through 3 the separating effect is as follows. As a result of the tangential configuration of the inlet 5 or the above described option of axial configuration with swirl-generating guiding means the venting flow 6 is imparted with a swirling action in the swirl chamber 2 that causes deposition of entrained oil on the circumferential walls of the swirl chamber 2 or, instead, a coagulation of finest oil droplets to larger oil drops. The thus prepared venting flow 6 exits together with the entrained oil through the outlet 8 and impacts parallel to the longitudinal axis 3 on the impact base 10 of the impact cup 9. Here it is deflected in radial direction outwardly which leads to collection of the entrained oil on the impact base 10. This effect is further enhanced in that the cross-sectional surface area of the circumferential gap 13 is smaller than the cross-sectional surface area of the outlet 8 so that a local acceleration of the venting flow 6 results.

After deflection on the impact base 10 another deflection on the circumferential wall 11 of the impact cup 9 occurs so that the venting flow 6 and the entrained oil are realized axis-parallel to the longitudinal axis 3 opposite to the flow within the swirl chamber 2 back in the direction of the baseplate 14. The venting flow 6 extends within the annular space that is formed inwardly in radial direction by the circumferential wall of the swirl chamber 2 and in radial direction outwardly by the circumferential wall 11 of the impact cup 9. Subsequently, the venting flow 6 impacts on the first baseplate 14 with the means 17 for oil collection and is then deflected again in radial direction outwardly and subsequently back to the second baseplate 15. The deflection that happens as a whole several times and partially with acceleration in connection with the swirl of the swirl chamber 2 leads finally to such a coagulation or film formation of the oil that is entrained in the venting flow 6 that the oil is finally caught on the means for oil collection 17 and can be drained in accordance with arrow 27 (FIG. 3). The venting flow 6 that is freed in this way from the entrained oil can be admixed in a known manner with fresh combustion air of the internal combustion engine after exiting from the separator 1 (FIG. 3).

Figure 4:
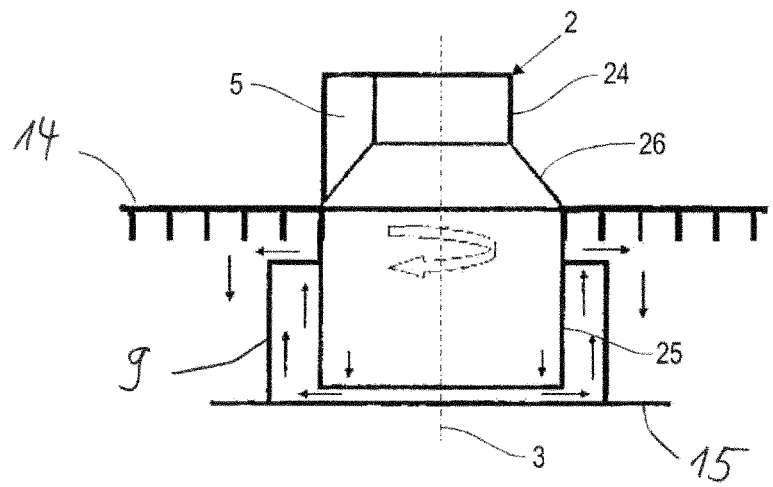
FIG. 4 a variant of the arrangement according to FIG. 1 with section-wise conically widening swirl chamber.

FIG. 4 shows a variant of the arrangement according to FIG. 1 with section-wise conically widening swirl chamber 2. To achieve this, between the first cylindrical section 24 and the second cylindrical section 25, a conically widening section 26 is arranged so that, in analogy to the illustration of FIG. 1, a cross-section of the swirl chamber 2 that widens in the direction of the longitudinal axis 3 will result. As in the embodiment according to FIG. 1, the inlet 5 is not only open in tangential direction but also in axial direction toward the inner side of the swirl chamber 2 so that an axial removability with a simple undivided injection mold is possible.

Figure 5:
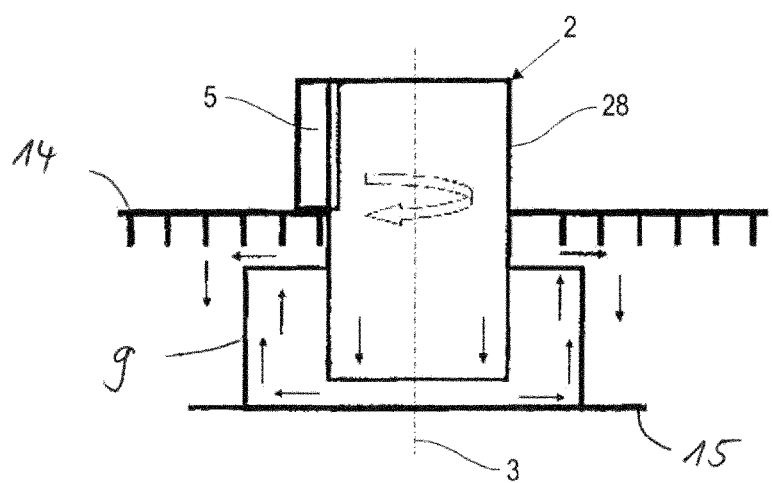
FIG. 5 a further variant of the arrangement according to FIGS. 1 and 4 wherein the swirl chamber along its longitudinal axis has a constant cross-section.

FIG. 5 shows a further variant of the swirl chamber 2 with a constant cross-section relative to the longitudinal axis 3 according to which the swirl chamber 2 has only a single cylindrical section 28. Here also a simple axial removability is provided. With regard to other features and reference numerals the embodiments according to FIGS. 4 and 5 are identical with one another as well as with those of FIGS. 1 to 3.

The simple geometric configuration of the illustrated inventive arrangement enables in particular by injection molding with uncomplicated mold design almost any miniaturization of the swirl chambers 2 and the impact cups 9. This makes it possible to provide appropriately small-sized swirl chambers 2 and impact cups 9 in a large number. In this connection, the effect is utilized that the obtainable separating diameter of entrained oil droplets for a reduced size is decreased and thus the separation performance is improved. Because of the monolithic configuration of the swirl chambers 2 with the first baseplate 14 and of the impacts cups 9 with the second baseplate 15, sealing measures are no longer necessary. Also, the two component groups that are formed by the two baseplate 14, 15 must not be separately sealed relative to one another. Instead, a simple mechanical fixation relative to one another is sufficient for which purpose preferably a mechanical snap-on locking action is provided. However, also an adhesive connection, a weld seam or the like may be expedient.

The invention claimed is:

1. Crank house ventilation separator (1) for an internal combustion engine, comprising:
   at least one swirl chamber (2) having rotational symmetry and extending along a longitudinal axis (3) extending between an inlet side end (4) and an outlet side end (7) of said swirl chamber (2), said swirl chamber including
   an inlet (5) arranged at said inlet side end (4) and directing a venting gas flow (6) tangentially into said swirl chamber (2), said tangential flow separating oil from said venting flow by centrifugal forces;
   a common outlet (8) for venting flow (6) and entrained oil leaving said swirl chamber (2), said common outlet (8) arranged at said outlet side (7);
   an impact cup (9) enclosing said common outlet (8) of said swirl cup (2), said impact cup (9) including
   an impact base (10) distally spaced apart from said common outlet (8) and extending radially about said longitudinal axis (3);
   a circumferential wall (11) secured to said impact base (10) and extending axially about and over at least a part of an outer wall of said swirl chamber (2);
   wherein said impact base (10) covers said common outlet (8) at a spacing thereto.

2. The separator according to claim 1, wherein
said common outlet (8) is has an opening delimited radially by a circumferential rim (12), said rim (12) arranged radially relative to said longitudinal axis (3), said circumferential rim (12) extending in a single plane (E);
wherein the rim (12) and impact base (10) are positioned parallel to said plane (E), said rim (12) and said impact base (10) positioned parallel to one another.

3. The separator according to claim 1, wherein
a circumferential gap (13) is formed between said common outlet (8) and said impact base (1), said circumferential gap (13) having a cross-sectional surface smaller than a cross-sectional surface of said outlet (8).

4. The separator according to claim 1, wherein
said impact cup (9) is arranged axis-parallel and coaxial to said longitudinal axis (3) of said swirl chamber (2).

5. The separator according to claim 1, wherein
said swirl chamber (2) along its longitudinal axis (3), beginning at the inlet side end (4) up to the outlet side end (7) including the outlet (8), has a constant or a widening cross-section.

6. The separator according to claim 1, wherein
said at least one swirl chamber (2) is a plurality of swirl chambers (2);
said impact cup (9) is a plurality of impact cups (9) said plurality of impact cups (9) relative to said plurality of swirl chambers (2);
wherein said plurality of swirl chambers (2) are arranged parallel to one another and connected fluidically to each process a portion of said venting flow (6) in parallel to one another.

7. The separator according to claim 6, wherein
said separator (1) includes a housing (21) enclosing said plurality of swirl chambers (2) and their related impact cups (9);
wherein an additional swirl chamber (2) is arranged at the base of the housing (21), said additional swirl chamber draining separated oil from said housing (21) to a raw side of an oil circuit for a very minimal volume flow through the separator (1).

8. The separator according to claim 6, wherein
a first base plate (14) is arranged within said housing (21), said first base plate (14) separating an interior of said housing (21) into an upstream vent flow chamber and a downstream vent flow chamber;
said plurality of swirl chambers (2) are arranged on said first baseplate (14) and monolithically formed therewith.

9. The separator according to claim 8, wherein
said plurality of impact cups (9) are arranged on a second baseplate (15) and monolithically formed therewith;

wherein said second base plate (15) is arranged within said housing (21) and in a spaced parallel relationship to said first base plate (14).

10. The separator according to claim 8, wherein said second baseplate (15) has at least one outlet opening (16) for the venting flow (6) flowing from said at least one swirl chamber (2) to reach said downstream vent flow chamber of said housing (21).

11. The separator according to claim 8, wherein said first baseplate (14) has a means (17) for collection of entrained oil exiting said impact cups (9) of said at least one swirl chamber (2), said means (17) deflection said vent flow coagulating separated entrained oil for drainage.

12. The separator according to claim 8, wherein said at least one swirl chamber (2) has arranged downstream thereof an oil after separator (18).

13. The separator according to claim 1, wherein said at least one swirl chamber (2) together with said inlet (4) and a at least a portion of said circumferential wall of said swirl chamber (2) s a monolithic component with said first baseplate (14) prepared by injection molding technology and is removable in a main removal direction.

14. The separator according to claim 1, wherein in an area between an exit of the venting flow (6) from the impact cup (9) and said first baseplate (14) a nonwoven oil separating medium (17') is arranged.

15. Crank house ventilation separator (1) for an internal combustion engine, comprising:
at least one swirl chamber (2) having rotational symmetry and extending along a longitudinal axis (3) extending between an inlet side end (4) to an outlet side end (7) of said swirl chamber (2), said swirl chamber including
an inlet (5) arranged at said inlet side end (4) and directing a venting gas flow (6) tangentially into said swirl chamber (2), said tangential flow separating oil from said venting flow by centrifugal forces;
a common outlet (8) for venting flow (6) and entrained oil leaving said swirl chamber (2), said common outlet (8) arranged at said outlet side (7);
an impact cup (9) enclosing said common outlet (8) of said swirl cup (2), said impact cup (9) including
an impact base (10) distally spaced apart from said common outlet (8) and extending radially about said longitudinal axis (3);
a circumferential wall (11) secured to said impact base (10) and extending axially about and over at least a part of an outer wall of said swirl chamber (2);
wherein said impact base (10) covers said common outlet (8) at a spacing thereto:
wherein said impact base (10) has a surface area that is the same as, smaller or minimally greater than a cross-sectional surface area of said swirl chamber (2).

\* \* \* \* \*